United States Patent
Sonozaki et al.

(10) Patent No.: US 9,685,708 B2
(45) Date of Patent: Jun. 20, 2017

(54) WAVEGUIDE TUBE SLOT ANTENNA AND WIRELESS DEVICE PROVIDED THEREWITH

(71) Applicants: Tomokazu Sonozaki, Mie (JP); Hiroyuki Noda, Mie (JP); Natsuhiko Mori, Mie (JP)

(72) Inventors: Tomokazu Sonozaki, Mie (JP); Hiroyuki Noda, Mie (JP); Natsuhiko Mori, Mie (JP)

(73) Assignee: NTN CORPORATION, Osaka (JP)

( * ) Notice: Subject to any disclaimer, the term of this patent is extended or adjusted under 35 U.S.C. 154(b) by 135 days.

(21) Appl. No.: 14/422,874

(22) PCT Filed: Jul. 25, 2013

(86) PCT No.: PCT/JP2013/070176
§ 371 (c)(1),
(2) Date: Feb. 20, 2015

(87) PCT Pub. No.: WO2014/030488
PCT Pub. Date: Feb. 27, 2014

(65) Prior Publication Data
US 2015/0229027 A1 Aug. 13, 2015

(30) Foreign Application Priority Data

Aug. 23, 2012 (JP) .................................. 2012-184177
Aug. 23, 2012 (JP) .................................. 2012-184181
Jun. 18, 2013 (JP) .................................. 2013-127619

(51) Int. Cl.
*H01Q 13/10* (2006.01)
*H01Q 13/18* (2006.01)
(Continued)

(52) U.S. Cl.
CPC ............... *H01Q 13/18* (2013.01); *G01S 7/03* (2013.01); *H01Q 1/3233* (2013.01);
(Continued)

(58) Field of Classification Search
USPC ........................................ 343/771, 702, 768
See application file for complete search history.

(56) References Cited

U.S. PATENT DOCUMENTS

2004/0090290 A1  5/2004  Teshirogi et al.
2005/0146477 A1*  7/2005  Kelly ................... H01Q 1/3275
343/771
(Continued)

FOREIGN PATENT DOCUMENTS

GB     758457    10/1956
JP     3-7406    1/1991
(Continued)

OTHER PUBLICATIONS

Extended European Search Report issued Mar. 3, 2016 in counterpart European Application No. 13830699.8.
(Continued)

*Primary Examiner* — Hoang Nguyen
*Assistant Examiner* — Hai Tran
(74) *Attorney, Agent, or Firm* — Wenderoth, Lind & Ponack, L.L.P.

(57) ABSTRACT

Provided is a waveguide tube slot antenna (1) including: a plurality of waveguides (2) arranged in parallel with each other; a plurality of radiating slots (3) formed along each of the plurality of waveguides (2); and a plurality of waveguide tubes (10) connected in parallel with each other, in which the plurality of waveguide tubes (10) each include a first waveguide tube forming member (11) and a second waveguide tube forming member (12) each having a transverse section having a shape with an end, the first waveguide tube forming
(Continued)

member and the second waveguide tube forming member being configured to define one of the plurality of waveguides (2) by being connected to each other.

20 Claims, 10 Drawing Sheets

(51) Int. Cl.
*G01S 7/03* (2006.01)
*H01Q 21/00* (2006.01)
*H01Q 1/32* (2006.01)
*H01Q 13/22* (2006.01)
*H01Q 13/20* (2006.01)
*H01Q 21/06* (2006.01)
*G01S 13/88* (2006.01)
*G01S 13/93* (2006.01)

(52) U.S. Cl.
CPC ............. *H01Q 13/10* (2013.01); *H01Q 13/20* (2013.01); *H01Q 13/22* (2013.01); *H01Q 21/005* (2013.01); *H01Q 21/0043* (2013.01); *H01Q 21/0087* (2013.01); *H01Q 21/06* (2013.01); *H01Q 21/061* (2013.01); *G01S 13/886* (2013.01); *G01S 13/931* (2013.01)

(56) References Cited

U.S. PATENT DOCUMENTS

| | | | |
|---|---|---|---|
| 2006/0132374 A1 | 6/2006 | Wang | |
| 2007/0063914 A1* | 3/2007 | Becker | A62C 35/60 |
| | | | 343/840 |
| 2009/0315783 A1* | 12/2009 | Uehara | C08K 3/22 |
| | | | 343/700 R |

FOREIGN PATENT DOCUMENTS

| | | |
|---|---|---|
| JP | 5-6921 | 1/1993 |
| JP | 2000-13135 | 1/2000 |
| JP | 2000-341030 | 12/2000 |
| JP | 2003-198242 | 7/2003 |
| JP | 2003-318648 | 11/2003 |
| JP | 2007-228313 | 9/2007 |

OTHER PUBLICATIONS

Japanese Office Action dated May 18, 2016, in counterpart Japanese Application No. 2012-184177, with English translation.
International Preliminary Report on Patentability and Written Opinion of the International Searching Authority issued Feb. 24, 2015 in International (PCT) Application No. PCT/JP2013/070176.
International Search Report issued Oct. 8, 2013 in International (PCT) Application No. PCT/JP2013/070176.

* cited by examiner power supply

WAVEGUIDE TUBE SLOT ANTENNA AND WIRELESS DEVICE PROVIDED THEREWITH

TECHNICAL FIELD

The present invention relates to a waveguide tube slot antenna and a wireless device provided therewith.

BACKGROUND ART

In recent years, a radar device (radar system) serving as a kind of wireless device is sometimes mounted to an automobile for the purpose of safe driving support or the like (for example, collision prevention). As an on-vehicle radar device of this kind, there is a device that uses a laser radar as a sensor or a device that uses a millimeter wave radar as a sensor. However, a sensing capability (resolving power) of the laser radar is liable to change due to external factors such as dirt on a vehicle and weather conditions. Therefore, in recent times, there has been more often employed a millimeter wave radar whose resolving power is hard to change due to the external factors and which can stably exhibit a desired resolving power at all times. Note that, the millimeter wave represents an electromagnetic wave having a wavelength of from 1 to 10 mm and a frequency of from 30 to 300 GHz.

In the above-mentioned millimeter wave radar, a waveguide tube slot antenna (referred to also as "waveguide tube slot array antenna") is sometimes used as an antenna part for transmitting or receiving a radio wave. As a waveguide tube slot antenna of this kind, for example, in Patent Literature 1, there is disclosed a waveguide tube slot antenna including: a radiating slot body structure in which a radiating slot plate having an infinite number of radiating slots and a plurality of waveguide walls defining a plurality of waveguides are integrally molded with a resin and in which a metal plated coating film is formed at least on a defining surface of the waveguides; and a radiating back plate firmly attached to the radiating slot body structure. The radiating back plate is formed of metal, or is formed of a resin in which a metal plated coating film is formed at least on an inner surface thereof.

As the antenna part of the above-mentioned millimeter wave radar, the waveguide tube slot antenna disclosed in Patent Literature 2 may also be used. The waveguide tube slot antenna is formed by forming a plurality of slot-like antenna elements (radiating slots) in one surface of a metallic hollow waveguide tube (rectangular waveguide tube) that is seamless in its transverse section.

The waveguide tube slot antenna can be used not only as the antenna part for transmitting or receiving a radio wave having a millimeter wave band as described above but also as an antenna part for transmitting or receiving a radio wave having a centimeter wave band (radio wave having a wavelength of approximately from 10 to 100 mm and a frequency of from 3 to 30 GHz). Examples of the waveguide tube slot antenna that uses the radio wave having a centimeter wave band can include a wireless transmission system such as a wireless LAN or Bluetooth (trademark).

CITATION LIST

Patent Literature 1: JP 2000-13135 A
Patent Literature 2: JP 2000-341030 A

SUMMARY OF INVENTION

Technical Problem

The waveguide tube slot antenna disclosed in Patent Literature 1 can be formed only by firmly attaching a radiating back plate to a radiating slot body structure, and further, at least the radiating slot body structure among the radiating slot body structure and the radiating back plate is made of a resin, which may allow mass production thereof at low cost. However, there is room for improvement in the antenna disclosed in Patent Literature 1.

For example, the number of arrayed waveguides of the waveguide tube slot antenna is appropriately set in accordance with required antenna performance and the like. However, as described above, the waveguide tube slot antenna disclosed in Patent Literature 1 is formed by firmly attaching one radiating back plate to the radiating slot body structure formed by integrally molding a radiating slot plate and a plurality of waveguide walls with a resin, and hence the number of arrayed waveguides cannot be changed arbitrarily. That is, the waveguide tube slot antenna disclosed in Patent Literature 1 is low in degree of freedom in design (degree of freedom in changing the antenna performance). In the configuration disclosed in Patent Literature 1, in order to change the number of arrayed waveguides, it is necessary to mold the radiating slot body structure by using a different molding die and prepare and possess many different kinds of radiating back plates corresponding to a dimension (size) or the like of the radiating slot body structure, which is undesirably disadvantageous in terms of capital investment and management cost.

Further, the antenna performance of the waveguide tube slot antenna greatly depends on accuracy of the shape and dimension of the waveguide, and therefore, at least a portion defining the waveguide is demanded to have particularly high accuracy. However, the above-mentioned radiating slot body structure forming the waveguide tube slot antenna disclosed in Patent Literature 1 is a relatively large-scale resin component, which is liable to produce relatively large sink, warp, bend, or the like through molding shrinkage. Therefore, with the configuration disclosed in Patent Literature 1, it is difficult to stably obtain the waveguide tube slot antenna that can exhibit desired antenna performance, and there is also a problem in that product yield deteriorates as a result.

Further, in order to lower a price of the above-mentioned various kinds of wireless device, there is a need to lower the cost of the waveguide tube slot antenna. However, when a metallic rectangular waveguide tube that is seamless in its transverse section is used as in the waveguide tube slot antenna disclosed in Patent Literature 2, a radiating slot must be formed by machining, which raises a problem in massproductivity (manufacturing cost). Further, performance of various kinds of wireless device greatly depends on the antenna performance, and hence the waveguide tube slot antenna is also demanded to increase the antenna performance.

In view of the above-mentioned actual circumstances, a first object of the present invention is to allow low-cost mass production of a waveguide tube slot antenna that is high in performance and high in degree of freedom in design change.

Further, a second object of the present invention is to allow a waveguide tube slot antenna with increased antenna performance to be provided at low cost.

Solution to Problem

According to one embodiment of the present invention (first aspect), which is devised to solve the first object, there is provided a waveguide tube slot antenna, comprising: a plurality of waveguides arranged in parallel with each other; a plurality of radiating slots formed along each of the plurality of waveguides; and a plurality of waveguide tubes connected in parallel with each other, wherein the plurality of waveguide tubes each comprise a first waveguide tube forming member and a second waveguide tube forming member each having a transverse section having a shape with an end, the first waveguide tube forming member and the second waveguide tube forming member being configured to define one of the plurality of waveguides by being coupled to each other. Note that, the "transverse section" is synonymous with a "cross section orthogonal to a tube axis direction." The same applies to a second aspect of the present invention described later.

The waveguide tube slot antenna according to the first aspect is formed by connecting the waveguide tubes each comprising one waveguide in parallel with each other. Therefore, only by connecting the waveguide tubes in parallel whose number corresponds to the required antenna performance (number of arrayed waveguides), it is possible to obtain an antenna having desired performance. Accordingly, the waveguide tube slot antenna according to the first aspect is so high in degree of freedom of design change (degree of freedom in changing the antenna performance) as to allow the number of arrayed waveguides to be arbitrarily changed.

Further, in the waveguide tube slot antenna according to the first aspect, each waveguide tube (waveguide) is formed by coupling the first waveguide tube forming member and the second waveguide tube forming member whose transverse sections each have the shape with the end. In this case, it suffices that the first waveguide tube forming member and the second waveguide tube forming member both have such a structure as to be able to define one waveguide in cooperation with each other, and hence a shape thereof is simplified and a size thereof is reduced greatly compared to the radiating slot body structure disclosed in Patent Literature 1 or the like. Therefore, it is possible to stably obtain a high-accuracy waveguide. Further, in this case, it is possible to enhance the product yield by reducing a fraction defective thereof. Accordingly, it is possible to obtain a high-performance waveguide tube slot antenna at low cost.

In the above-mentioned configuration, it is preferred that the first waveguide tube forming member and the second waveguide tube forming member be formed so as to have a shape (for example, U shape or L-shape in cross section) in which the transverse section of each part of the waveguide in an extending direction thereof has a corner part. With this configuration, compared to a case of a shape (for example, flat shape in cross section) having no corner part, it is possible to increase rigidity, in particular, torsional rigidity, of the waveguide tube forming member, which can increase form stability of the waveguide.

In the above-mentioned configuration, any one of the first waveguide tube forming member and the second waveguide tube forming member may comprise the plurality of radiating slots, and another of the first waveguide tube forming member and the second waveguide tube forming member may comprise a power supply port. With this configuration, compared to a case where the radiating slot and the power supply port are formed across a coupling part of the first waveguide tube forming member and the second waveguide tube forming member, it is possible to increase form accuracy of the radiating slot and the power supply port, which is advantageous in enhancing the antenna performance.

In the above-mentioned configuration, the plurality of waveguide tubes can be separably connected in parallel with each other. With this configuration, the degree of freedom in changing the antenna performance further increases.

Further, according to one embodiment of the present invention (second aspect), which is devised to solve the second object, there is provided a waveguide tube slot antenna, comprising, along a tube axis direction of a waveguide tube comprising a waveguide extending in the tube axis direction: a plurality of radiating slots; and a plurality of inner walls for reducing a cross sectional area of the waveguide in formation positions of the plurality of radiating slots, wherein the waveguide tube comprises a first waveguide tube forming member and a second waveguide tube forming member each having a transverse section having a shape with an end, the first waveguide tube forming member and the second waveguide tube forming member being configured to define the waveguide by being coupled to each other.

As described above, the inner wall for reducing the cross sectional area of the waveguide in the formation position of the radiating slot is provided, which can enhance radiant efficiency of a radio wave that propagates inside the waveguide. The waveguide tube slot antenna according to one embodiment of the present invention comprises a plurality of the above-mentioned inner walls in addition to the radiating slots, and hence it is conceivable that a shape thereof becomes complicated and manufacturing cost thereof increases compared to a related-art antenna. However, with the configuration according to one embodiment of the present invention, the waveguide tube is formed by coupling two members (first waveguide tube forming member and second waveguide tube forming member) whose transverse sections each have a shape with an end, and can therefore be subjected to mass production at low cost with high accuracy. That is, by forming the waveguide tube by coupling the first waveguide tube forming member and the second waveguide tube forming member described above, it is possible to take such a measure as to form all the plurality of radiating slots in the first waveguide tube forming member while providing all the plurality of inner walls to the second waveguide tube forming member, and hence it is possible to obtain the components of the waveguide tube slot antenna relatively easily with high accuracy. As described above, according to the second aspect, it is possible to obtain the waveguide tube slot antenna with increased antenna performance at low cost.

The waveguide tube slot according to the second aspect may comprise a power supply port. In this case, two inner walls adjacent to each other in the tube axis direction may satisfy a relational expression of $h_1 \leq h_2$, where $h_1$ represents a height dimension of one of the two inner walls on a side relatively close to the power supply port and $h_2$ represents a height dimension of another of the two inner walls on a side relatively far from the power supply port. With this configuration, an amount (radio wave intensity) of radio waves radiated to an outside of the antenna through each of the radiating slots is hard to vary among the radiating slots. Accordingly, it is possible to avoid variations of the antenna performance in each part of the antenna as much as possible, which can increase reliability.

The waveguide tube slot antennas according to the first aspect and the second aspect can further comprise a recess part having one of the plurality of radiating slots opened in an inner bottom surface thereof. With this configuration, it is possible to suppress extraneous emission referred to also as grating lobes, which can further improve the antenna performance.

In the above-mentioned configuration, the first waveguide tube forming member and the second waveguide tube forming member may be both formed of a resin and may each comprise at least a conductive coating film formed on a defining surface of the waveguide. In this manner, both the waveguide tube forming members are formed of the resin (injection molding), the waveguide tube slot antenna having a desired antenna characteristic can be subjected to mass production at lower cost. Further, both the waveguide tube forming members comprise the conductive coating film at least on the defining surface of the waveguide, and thus the radio wave (high-frequency current) supplied into the waveguide tube can smoothly propagate along the waveguide.

When the waveguide tube forming member is made of a resin, a resin made of a liquid crystal polymer (LCP) as a main ingredient thereof may be preferably used as a molding resin thereof. This is because the LCP is excellent in the form stability and can suppress an occurrence amount of burrs caused by the molding. The molding resin for the waveguide tube forming member can be formulated with various kinds of filler such as a glass fiber (GF) as necessary in order to increase the form stability and mechanical strength of the waveguide tube forming member.

The film thickness of the conductive coating film becomes lower in resistance when being too thin, and when being too thick to the contrary, requires an excessive amount of time for coating film formation, which leads to increased cost. Accordingly, it is preferred that the film thickness of the conductive coating film be set to 0.2 µm or more and 1.5 µm or less. Further, the conductive coating film may have a single-layer structure, but it is preferred that a multi-layer structure be employed. Specifically, it is preferred that the conductive coating film be formed by stacking two or more kinds of metal plated coating films. For example, a first metal plated coating film is formed of copper or silver particularly high in conductivity among metals, and a second metal plated coating film is formed of nickel high in resistance on the first metal plated coating film. With this configuration, the conductive coating film excellent in both conductivity and resistance can be obtained, which improves reliability of the antenna.

The waveguide tube may comprise a rectangular waveguide tube comprising: a pair of wide walls having a relatively long transverse sectional dimension which are parallel with each other; and a pair of narrow walls having a relatively short transverse sectional dimension which are parallel with each other. In this case, in the waveguide tube slot antenna: (1) any one of the pair of narrow walls may comprise the plurality of radiating slots and another of the pair of narrow walls may comprise the plurality of inner walls, and the first waveguide tube forming member may comprise one of the pair of narrow walls and the second waveguide tube forming member may comprise another of the pair of narrow walls; and (2) any one of the pair of wide walls may comprise the plurality of radiating slots and another of the pair of wide walls may comprise the plurality of inner walls, and the first waveguide tube forming member may comprise one of the pair of wide walls and the second waveguide tube forming member may comprise another of the pair of wide walls.

The waveguide tube slot antenna according to the one embodiment of the present invention has such characteristics as described above, and hence a wireless device comprising the waveguide tube slot antenna is low in cost, excellent in transmission or reception performance of the radio wave, and high in the reliability.

Advantageous Effects of Invention

As described above, according to the first aspect of this application, the waveguide tube slot antenna that is high in performance and high in degree of freedom in design (degree of freedom in changing the antenna performance) can be subjected to mass production at low cost.

Further, according to the second aspect of this application, the waveguide tube slot antenna with the increased antenna performance can be provided at low cost.

DESCRIPTION OF EMBODIMENTS

Now, an embodiment of a first aspect of the present invention is described with reference to FIG. 1 to FIG. 7.

Figure 1A:
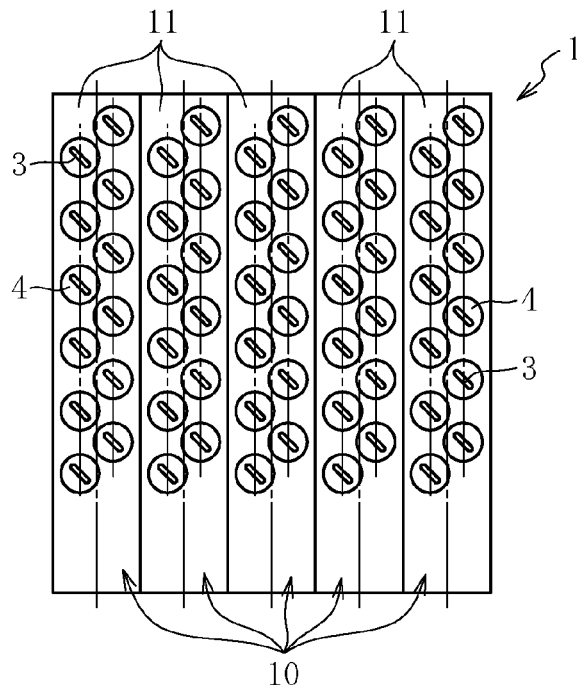
FIG. 1A is a schematic plan view of a waveguide tube slot antenna according to a first embodiment of a first aspect of the present invention.
Figure 1B:
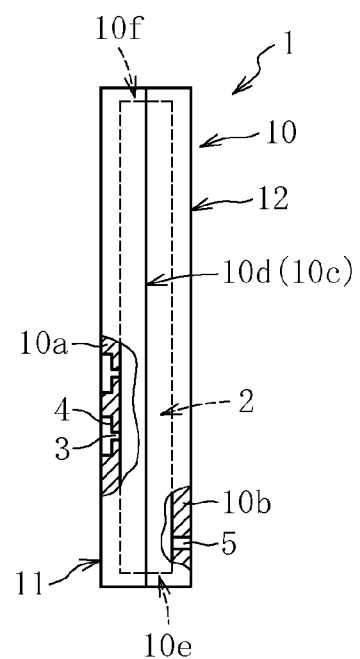
FIG. 1B is a schematic side view of the same.
Figure 1C:
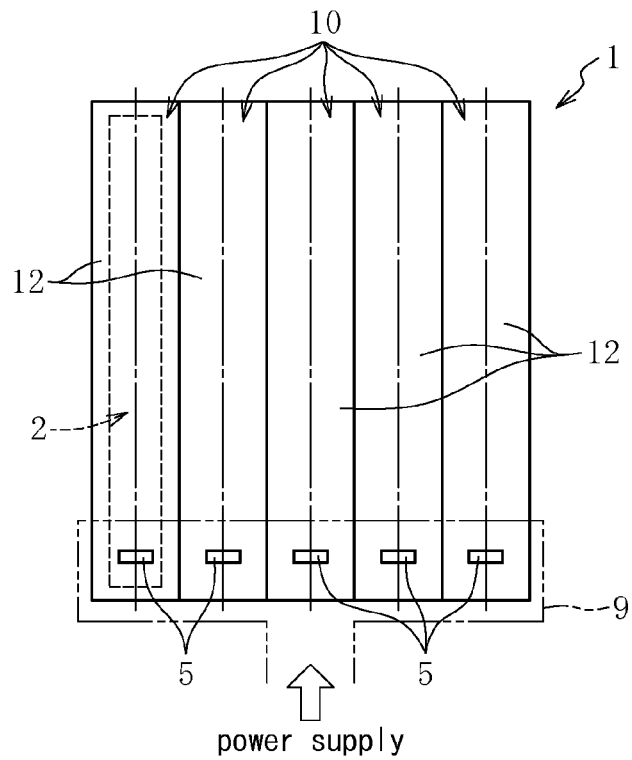
FIG. 1C is a schematic back view of the same.

FIG. 1A to FIG. 1C illustrate a plan view, a side view, and a back view of a waveguide tube slot antenna 1 according to a first embodiment of the first aspect, respectively. The waveguide tube slot antenna 1 illustrated in FIG. 1A to FIG. 1C constructs, for example, an antenna part of a radar system (on-vehicle radar system) mounted to an automobile for the purpose of safe driving support or the like, and is formed by connecting a plurality of (five in the example of FIG. 1A to FIG. 1C) waveguide tubes 10 in parallel with each other. Each waveguide tube 10 comprises one waveguide 2 through which a radio wave flows in an inside thereof as illustrated in FIG. 1B or the like. Accordingly, the waveguide tube slot antenna 1 comprises five waveguides 2 arranged in parallel with each other. Note that, of the five waveguide tubes 10, for example, the waveguide tube 10 located in a central part can function as an antenna for transmission, and the two waveguide tubes 10 arranged on both sides in a width direction thereof can function as an antenna for reception.

Each of the waveguide tubes 10 is a so-called rectangular waveguide tube comprising a pair of a top wall 10a and a bottom wall 10b that are parallel with each other, a pair of side walls 10c and 10d that are parallel with each other, and a pair of termination walls 10e and 10f for closing one opening and the other opening in a tube axis direction (direction in which the waveguide tube 10 extends). Note that, a transverse sectional dimension of the top wall 10a and the bottom wall 10b is shorter than a transverse sectional dimension of the side walls 10c and 10d. Accordingly, the top wall 10a and the bottom wall 10b form a so-called narrow wall, and the side walls 10c and 10d form a so-called wide wall.

As illustrated in FIG. 1 (*a*), the top wall 10a of each waveguide tube 10 comprises a radiating slot 3 for radiating the radio wave passing through the waveguide 2 of the waveguide tube 10 to an outside thereof (or for taking the radio wave reflected from the target object into the waveguide 2). A plurality of radiating slots 3 are arranged at predetermined intervals along the tube axis direction of the waveguide tube 10. Further, in this embodiment, each radiating slot 3 is formed in an inner bottom surface of a recess part 4 opened in a surface of the top wall 10a, and a straight line extending through the central part in the width direction is inclined by 45° with respect to the tube axis direction (counterclockwise). An inclination angle of the radiating slot 3 with respect to the tube axis direction can be set appropriately in accordance with a purpose or the like.

As illustrated in FIG. 1B and FIG. 1C, the bottom wall 10b (area of the bottom wall 10b close to the termination wall 10e) of each waveguide tube 10 comprises a power supply port 5. When the waveguide tube slot antenna 1 is used in actuality, a power supply waveguide tube 9 (indicated by the chain double-dashed line in FIG. 1C) is fixed to the bottom wall 10b side of the waveguide tube 10 by appropriate means, and high-frequency power (radio wave) is supplied into the waveguide 2 through the power supply waveguide tube 9 and the power supply port 5.

Figure 2:
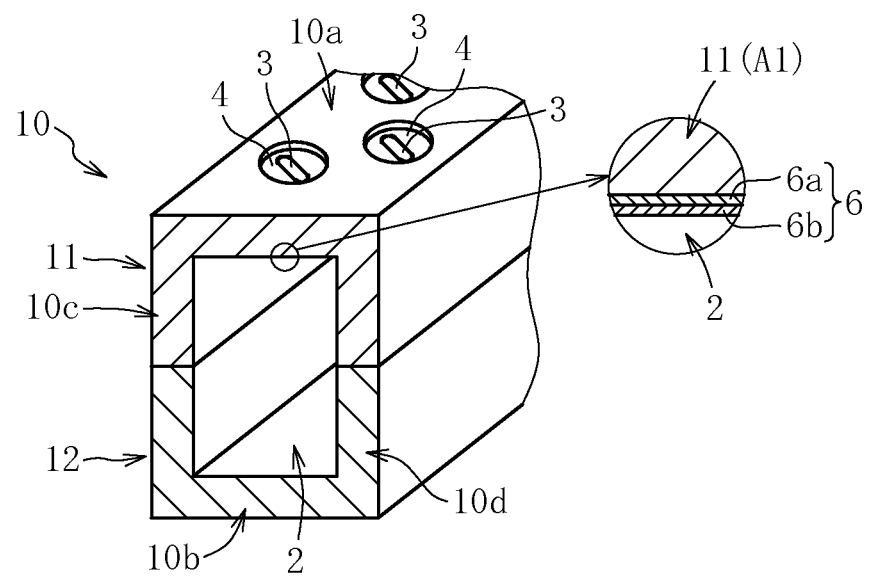
FIG. 2 is a schematic perspective view including an axially orthogonal cross section of one waveguide tube that forms the waveguide tube slot antenna illustrated in FIG. 1.

As illustrated in FIG. 1B and FIG. 2, each waveguide tube 10 is formed by coupling a first waveguide tube forming member 11 and a second waveguide tube forming member 12 to each other. A transverse section of each of the first waveguide tube forming member 11 and the second waveguide tube forming member 12 has a shape with an end in each part of the waveguide 2 in an extending direction thereof.

The first waveguide tube forming member 11 integrally comprises the top wall 10a comprising the plurality of radiating slots 3 and a plurality of the recess parts 4, portions forming a part of the pair of side walls 10c and 10d, and portions forming a part of the termination walls 10e and 10f. Further, the second waveguide tube forming member 12 integrally comprises the bottom wall 10b comprising the power supply port 5, portions forming the remaining part of the pair of side walls 10c and 10d, and portions forming the remaining part of the termination walls 10e and 10f In short, the transverse sections of both the waveguide tube forming members 11 and 12 according to this embodiment form a U shape in each part of the waveguide 2 in the extending direction thereof (transverse sections thereof each have a shape with a corner part).

Figure 3:
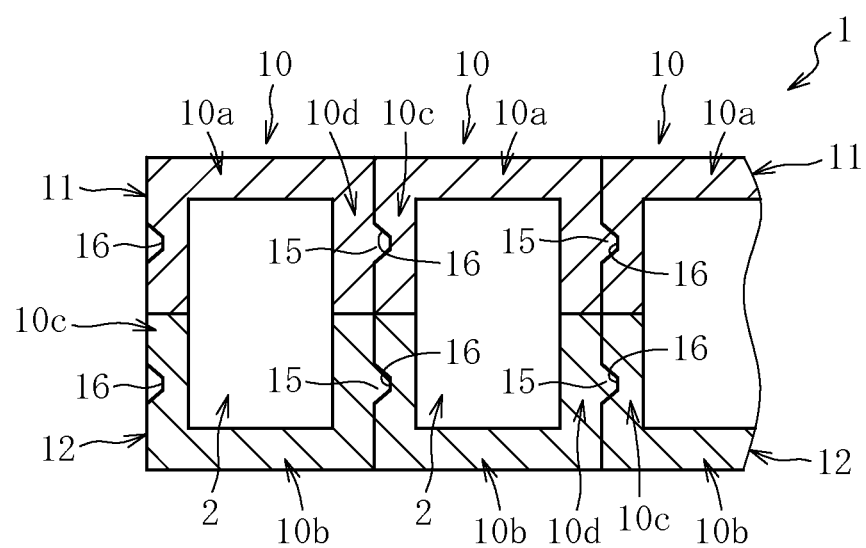
FIG. 3 is a schematic sectional view of a principal part of the waveguide tube slot antenna illustrated in FIG. 1.

As described above, the slot antenna 1 is formed by connecting five waveguide tubes 10 in parallel with each other, and in this embodiment, the five waveguide tubes 10 are separably connected in parallel with each other. Such a connection mode is realized by, for example, forming one or a plurality of depression and projection fitting structures between the adjacent waveguide tubes 10 and 10. In this embodiment, as illustrated in FIG. 3, of the adjacent waveguide tubes 10 and 10, any one of the waveguide tubes 10 comprises a projection part 15 in a sidewall thereof, and the other waveguide tube 10 comprises a depression part 16 into which the projection part 15 can be fitted (press-fitted) in a sidewall thereof. Through press-fitting of the projection part 15 of the one waveguide tube 10 into the depression part 16 of the other waveguide tube 10, the above-mentioned depression and projection fitting structure is formed. Note that, in the example of the FIG. 3, the projection part 15 and the depression part 16 are formed in the both the first waveguide tube forming member 11 and the second waveguide tube forming member 12, but a formation mode of the projection part 15 and the depression part 16 can be arbitrarily changed as long as a desired connecting (joining) strength can be ensured. For example, the projection part 15 and the depression part 16 may be formed in only any one of the first waveguide tube forming member 11 and the second waveguide tube forming member 12.

It should be understood that means for connecting a plurality of the waveguide tubes 10 in parallel with each other is not limited to the above-mentioned depression and projection fitting structure. For example, the plurality of waveguide tubes 10 can be connected in parallel with each other by fixing the waveguide tubes 10 and 10 to each other with a double coated tape, an adhesive, or the like.

The first waveguide tube forming member 11 is an injection-molded article of a resin, and the radiating slot 3 and the recess part 4 are formed by molding simultaneously with injection molding. Further, the second waveguide tube forming member 12 is also an injection-molded article of a resin, and the power supply port 5 is formed by molding simultaneously with the injection molding. As a molding resin for the waveguide tube forming members 11 and 12, a resin having a thermoplastic resin that allows the injection molding as a main ingredient thereof (base resin) is used. As the base resin, for example, at least one kind selected from the group consisting of a liquid crystal polymer (LCP), a poly(phenylene sulfide) (PPS), a polyacetal (POM), and the like is used. An appropriate filler is added to the base resin as necessary. In this embodiment, the resin material having the LCP as the main ingredient to which an appropriate amount of glass fibers (GF) is added as a filler is used to individually perform the injection molding for the first waveguide tube forming member 11 and the second waveguide tube forming member 12. The LCP is preferred because the LCP is excellent in form stability compared to a PPS or the like and can preferably suppress an occurrence amount of burrs caused by the molding. Further, the glass fiber is preferred because the glass fiber is cheaper than a carbon fiber (CF) and can provide high form stability and mechanical strength to a molded article.

As illustrated in the enlarged view in FIG. 2, inside the first waveguide tube forming member 11, a conductive coating film 6 is formed on at least a defining surface of the waveguide 2. In the same manner, inside the second waveguide tube forming member 12, the conductive coating film 6 is formed on at least the defining surface of the waveguide 2 (not shown). With this configuration, the radio wave (high-frequency current) supplied into the waveguide tube 10 made of the resin smoothly propagates along the waveguide 2. Note that, the conductive coating film 6 may be formed on entire surfaces of the waveguide tube forming members 11 and 12. With this configuration, masking formation work before the formation of the conductive coating film 6 and masking removal work after the formation of the conductive coating film 6 are unnecessary, which can suppress cost for coating film formation.

The conductive coating film 6 may be formed of a single-layer metal plated coating film, but in this embodiment, the conductive coating film 6 is formed of a first coating film 6a obtained by precipitation formation on the surfaces of the waveguide tube forming members 11 and 12 and a second coating film 6b obtained by precipitation formation on the first coating film 6a. The first coating film 6a can be a plated coating film of a metal that is particularly excellent in conductivity such as copper, silver, or gold, and the second coating film 6b can be a plated coating film of a metal that is excellent in resistance (corrosion resistance) such as nickel. With the conductive coating film 6 having such a stacked structure, a usage amount of an expensive metal such as copper can be suppressed to obtain the conductive coating film 6 at low cost, and in addition, the conductive coating film 6 can have high conductivity and high resistance simultaneously.

As a method of forming the conductive coating film 6 (6a and 6b), for example, an electrolytic plating method or an electroless plating method can be employed, but the electroless plating method is preferred. This is because the electroless plating method is more likely to obtain the conductive coating film 6 (6a and 6b) having a uniform thickness than the electrolytic plating method, which is advantageous in ensuring desired antenna performance. Note that, the film thickness of the conductive coating film 6 becomes lower in resistance when being too thin, and when being too thick to the contrary, requires an excessive amount of time for coating film formation, which leads to increased cost. Accordingly, the film thickness of the conductive coating film 6 is set to 0.2 µm or more and 1.5 µm or less. Note that, the film thickness of the first coating film 6a can be set to approximately from 0.1 to 1.0 µm, and the film thickness of the second coating film 6b can be set to approximately from 0.1 to 0.5 µm.

Note that, when there is no particular problem in terms of cost, the conductive coating film 6 can also be formed by stacking three or more kinds of metal plated coating films.

To briefly describe a manufacturing procedure for the waveguide tube slot antenna 1 having the above-mentioned configuration, first, the first waveguide tube forming member 11 and the second waveguide tube forming member 12 are formed by the injection molding with the resin, and the conductive coating film 6 is formed on a predetermined portion of both the waveguide tube forming members 11 and 12, after which both the waveguide tube forming members 11 and 12 are coupled to each other to form the waveguide tube 10. Then, the above-mentioned depression and projection fitting structure is formed between the adjacent waveguide tubes 10 and 10, and a plurality of waveguide tubes 10 are connected in parallel with each other (separably connected in parallel with each other), thereby completing the waveguide tube slot antenna 1 illustrated in FIG. 1A to FIG. 1C.

Here, a coupling method for the first waveguide tube forming member 11 and the second waveguide tube forming member 12 is arbitrary, but in this embodiment, adhesion is employed. As an adhesive therefor, an anaerobic adhesive, an ultraviolet curable adhesive, a thermosetting adhesive, and the like can be used, but with the thermosetting adhesive that requires heat processing when the adhesive is cured, any one of or both the waveguide tube forming members 11 and 12 made of the resin may be deformed or the like while being subjected to the above-mentioned heat processing. Therefore, the anaerobic adhesive or the ultraviolet curable adhesive is preferred as the adhesive to be used to join both the members 11 and 12. Note that, when the waveguide tube 10 is thus formed by fixing the first waveguide tube forming member 11 and the second waveguide tube forming member 12 through adhesion, it is important to pay attention so as to prevent the adhesive from overflowing from an adhesion part, which is formed by fixing both the members through adhesion, particularly onto the defining surface of the waveguide 2. This is because the adhesive is generally an isolator, which may adversely affect propagation property of the radio wave inside the waveguide 2.

As described above, the waveguide tube slot antenna 1 according to the first aspect is formed by connecting the waveguide tubes 10 each comprising one waveguide 2 in parallel with each other (in this embodiment, separably connecting in parallel with each other). Therefore, it is possible to obtain the waveguide tube slot antenna 1 having desired antenna performance only by connecting the waveguide tubes 10 whose number corresponds to the required antenna performance (number of arrayed waveguides 2) in parallel with each other or separating the waveguide tubes 10 connected to each other. Accordingly, the waveguide tube slot antenna 1 according to the first aspect is so high in degree of freedom in design (degree of freedom in changing the antenna performance) that the number of arrayed waveguides 2 can be changed.

Further, in the waveguide tube slot antenna 1 according to this embodiment, each waveguide 2 is defined by joining the first waveguide tube forming member 11 and the second waveguide tube forming member 12 made of the resin. In this case, it suffices that the first waveguide tube forming member 11 and the second waveguide tube forming member 12 both have such a portion as to be able to define one waveguide 2 in cooperation with each other, and hence a size thereof is reduced compared to the radiating slot body structure disclosed in Patent Literature 1 or the like. Therefore, the first waveguide tube forming member 11 and the second waveguide tube forming member 12 are both suppressed from decreasing in form accuracy caused by molding shrinkage, with the result that shape/dimensional accuracy of each waveguide 2 is increased. With this configuration, the fraction defective can be reduced to improve product yield.

In this embodiment, both the first waveguide tube forming member 11 and the second waveguide tube forming member 12 are formed so as to have a shape (U shape) whose transverse section has the corner part in each part of the waveguide 2 in the extending direction thereof, which can increase the form stability of the waveguide 2 (waveguide tube 10). Therefore, it becomes advantageous in maintaining the antenna performance with high accuracy. In addition, the radiating slot 3 is formed in the first waveguide tube forming member 11, and the power supply port 5 is formed in the second waveguide tube forming member 12, which can increase the form accuracy of the radiating slot 3 and the power supply port 5 and ensure high antenna performance compared to a case where the radiating slot 3 and the power supply port 5 are formed across a coupling part of both the waveguide tube forming members 11 and 12.

The waveguide tube slot antenna 1 according to the first embodiment of the first aspect is described above, but appropriate changes can be made to the waveguide tube slot antenna 1 within a scope that does not depart from the gist of the present invention.

Figure 4:
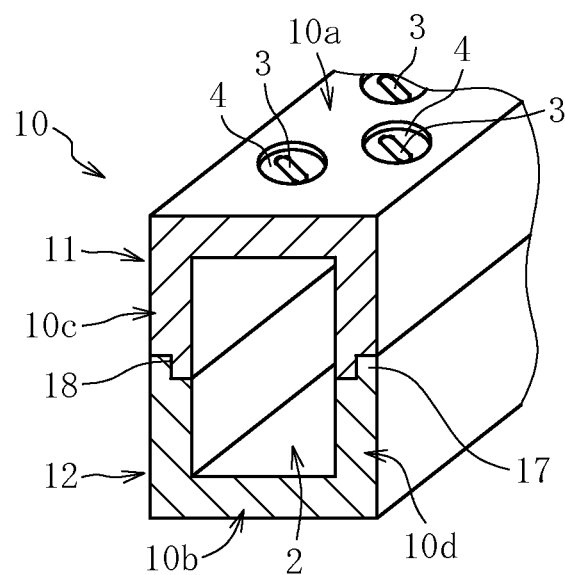
FIG. 4 is a schematic perspective view including an axially orthogonal cross section of a waveguide tube according to a modification example.
Figure 5:
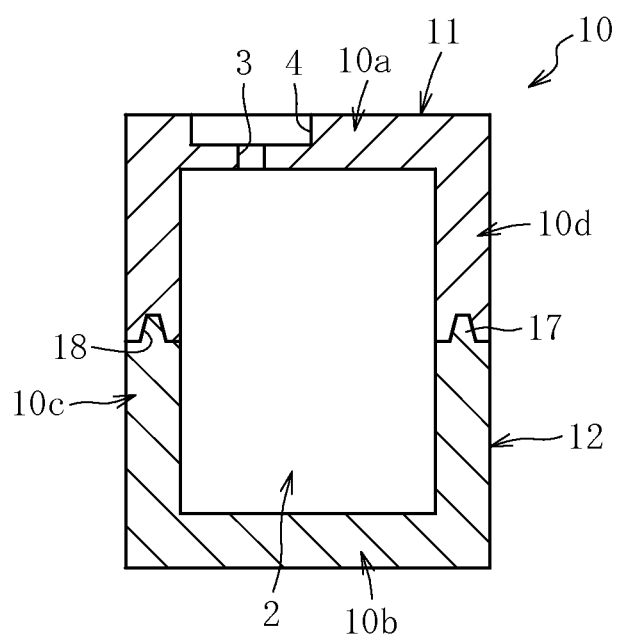
FIG. 5 is a schematic perspective view including the axially orthogonal cross section of the waveguide tube according to the modification example.

For example, the first waveguide tube forming member 11 and the second waveguide tube forming member 12 can be coupled to each other through depression and projection fitting as illustrated in FIG. 4 and FIG. 5. That is, any one of both the waveguide tube forming members 11 and 12 (second waveguide tube forming member 12 in FIG. 4 and FIG. 5) may comprise a projection part 17, while the other waveguide tube forming member (first waveguide tube forming member 11 in FIG. 4 and FIG. 5) may comprise a depression part 18 into which the projection part 17 is to be fitted (press-fitted), and by fitting (press-fitting) the projection part 17 into the depression part 18, both the waveguide tube forming members 11 and 12 may be integrally coupled to each other. Note that, FIG. 4 is an example of a case where depression and projection fitting parts of both the waveguide tube forming members 11 and 12 are formed over the entire coupling part (abutting part), and FIG. 5 is an example of a case where the depression and projection fitting parts are intermittently formed in the abutting part of both the waveguide tube forming members 11 and 12. When such depression and projection fitting is used to couple both the members 11 and 12 to each other, the adhesive may be interposed in the coupling part from the viewpoint of increasing the joining strength between both the members. In this case, the depression and projection fitting part serves as a labyrinth, and hence such an effect that the adhesive hardly overflows onto the defining surface of the waveguide 2 can be expected.

Figure 6:
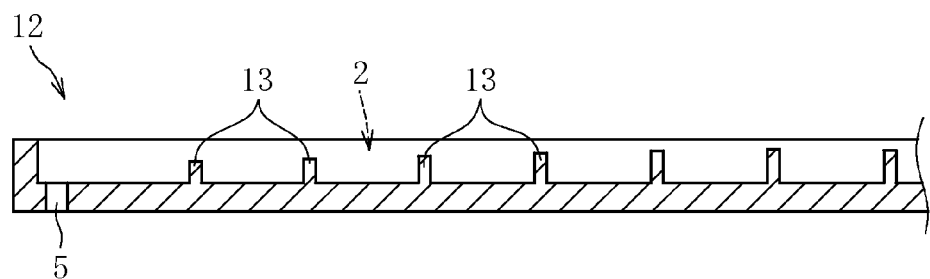
FIG. 6 is an axially parallel sectional view of a second waveguide tube forming member according to the modification example.

Further, inside the second waveguide tube forming member 12 to be coupled to the first waveguide tube forming member 11 having the above-mentioned configuration, in a position immediately below each radiating slot 3, as illustrated in FIG. 6, it is possible to provide an inner wall 13 erected in a direction for reducing a cross sectional area of the waveguide 2. In the example of FIG. 6, a height dimension of each inner wall 13 becomes minimum on the side close to the power supply port 5 and increases as a distance from the power supply port 5 increases. By providing such an inner wall 13, a radiant quantity (radiant intensity) of the radio wave radiated to the outside through the radiating slot can be substantially equalized among the radiating slots 3, which is advantageous in enhancing the antenna performance. Note that, in the case of providing the above-mentioned inner wall 13, in particular, the shape of the second waveguide tube forming member 12 is complicated. However, there is no need to consider an increase in manufacturing cost of the waveguide tube 10 as well as the waveguide tube slot antenna 1, for such reasons that the second waveguide tube forming member 12 is made of the resin (injection-molded article of a resin) and that the second waveguide tube forming member 12 is greatly downsized compared to the radiating slot body structure disclosed in Patent Literature 1, for example.

Figure 7A:
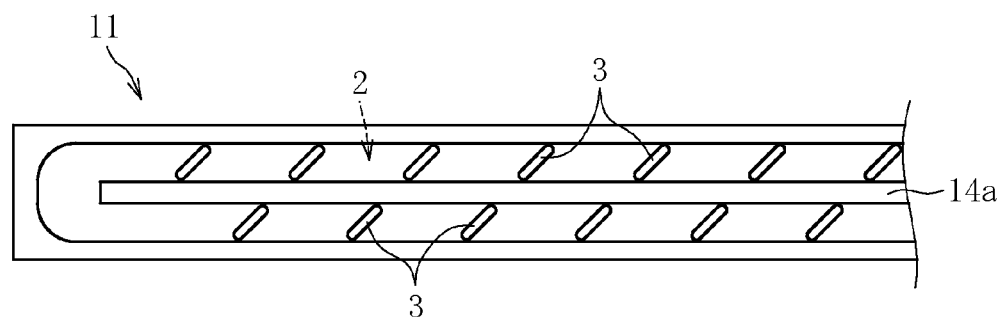
FIG. 7A is a developed plan view of a first waveguide tube forming member according to the modification example.
Figure 7B:
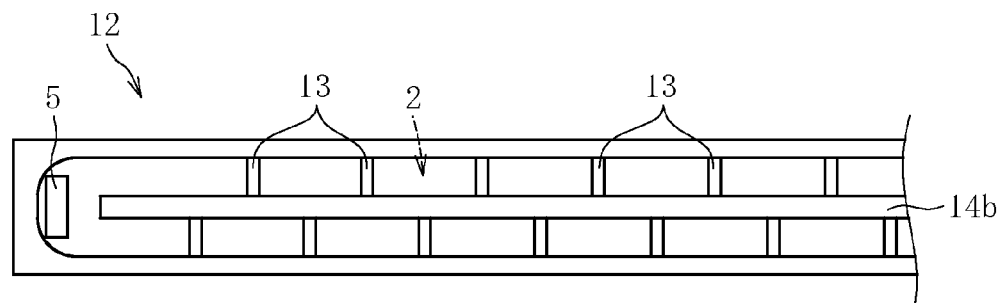
FIG. 7B is a developed plan view of the second waveguide tube forming member according to the modification example.

Further, the waveguide tube 10 may be formed by coupling the first waveguide tube forming member 11 and the second waveguide tube forming member 12 to each other whose developed plan views are illustrated in FIG. 7A and FIG. 7B, respectively. To describe the waveguide tube forming members 11 and 12 illustrated in FIG. 7A and FIG. 7B in detail, the first waveguide tube forming member 11 illustrated in FIG. 7A comprises a central wall 14a that is erected substantially in the central part in the width direction so as to extend in the tube axis direction, and the second waveguide tube forming member 12 illustrated in FIG. 7B comprises a central wall 14b that is erected substantially in the central part in the width direction so as to extend in the tube axis direction and is to be coupled to the central wall 14a. When the waveguide tube 10 is formed by coupling the first waveguide tube forming member 11 illustrated in FIG. 7A and the second waveguide tube forming member 12 illustrated in FIG. 7B to each other, one waveguide 2 defined in the waveguide tube 10 exhibits a U-shape in plan view. Note that, the second waveguide tube forming member 12 illustrated in FIG. 7B has the same configuration (inner wall 13) as the one illustrated in FIG. 6, but the inner wall 13 may be omitted.

Further, the waveguide tube 10 described above is formed by coupling the first waveguide tube forming member 11 and the second waveguide tube forming member 12 to each other whose transverse sections have substantially a U shape in each part of the waveguide 2 in the extending direction thereof, but the waveguide tube 10 can be formed by coupling the first waveguide tube forming member 11 and the second waveguide tube forming member 12 to each other whose transverse sections have substantially an L-shape (not shown).

In addition, in the above description, both the first waveguide tube forming member 11 and the second waveguide tube forming member 12 are the injection-molded article of the resin, but any one of or both the waveguide tube forming members 11 and 12 can be a metal machined article, a plastic worked article, or an injection-molded article of a low-melting metal (for example, magnesium or aluminum). In this case, the conductive coating film 6 becomes unnecessary.

Now, embodiments of a second aspect of the present invention are described with reference to FIG. 8 to FIG. 15.

Figure 8A:
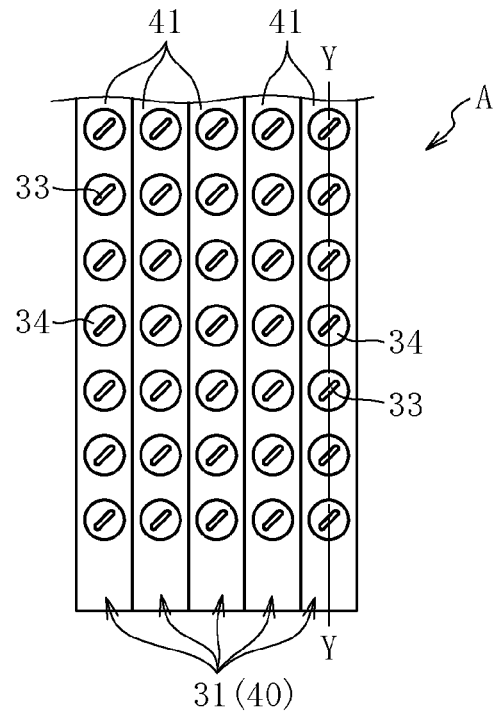
FIG. 8A is a schematic plan view of an antenna unit comprising a waveguide tube slot antenna according to a first embodiment of a second aspect of the present invention.
Figure 8B:
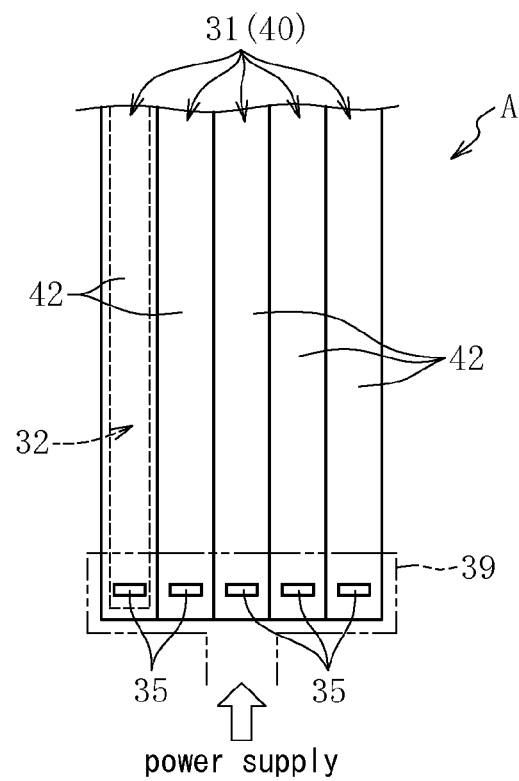
FIG. 8B is a schematic back view of the same.

FIG. 8A and FIG. 8B illustrate a plan view and a back view of an antenna unit A comprising a waveguide tube slot antenna 31 according to a first embodiment of the second aspect, respectively. The antenna unit A illustrated in FIG. 8 is used to transmit or receive the radio wave having, for example, a millimeter wave band (for example, 76-GHz band), and comprises a plurality of (five in the example of FIG. 8) waveguide tube slot antennas 31 connected in parallel with each other and a power supply waveguide tube 39 (see the chain double-dashed line in FIG. 8B) for supplying high-frequency power to each of the waveguide tube slot antennas 31. There are no special limitations on means for connecting the waveguide tube slot antennas 31 in parallel with each other, and, for example, fixation means such as adhesion, fixation with the double coated tape, and the depression and projection fitting are used singly or in combination of two or more kinds thereof. Of the five waveguide tube slot antennas 31, for example, the antenna 31 located in a central part can function as an antenna for transmission (sending) of the radio wave, and the two antennas 31 arranged on both sides in a width direction thereof can function as an antenna for reception.

Figure 9A:
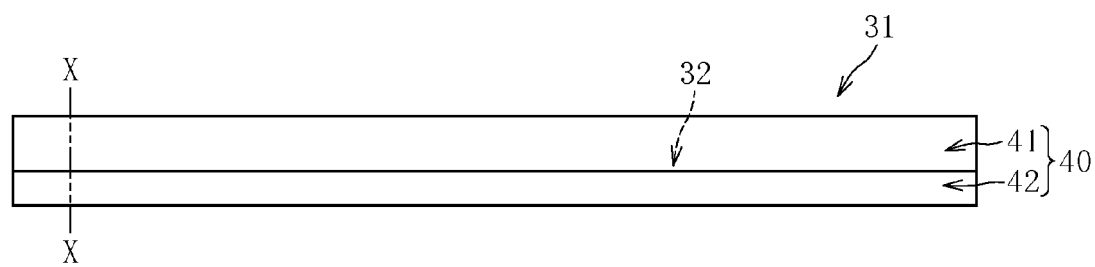
FIG. 9A is a side view of the waveguide tube slot antenna according to the first embodiment of the second aspect.
Figure 9B:
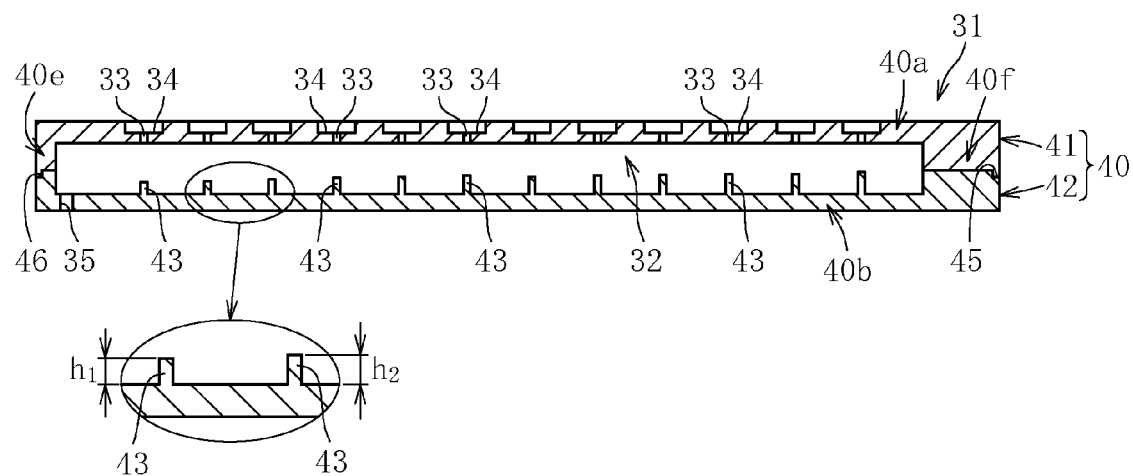
FIG. 9B is a schematic sectional view taken along the line Y-Y illustrated in FIG. 9A.
Figure 9C:
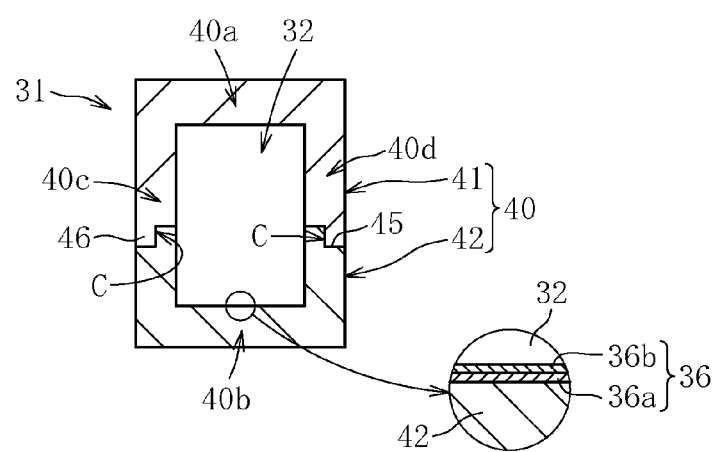
FIG. 9C is a schematic sectional view taken along the line X-X illustrated in FIG. 9A.

Next, a detailed structure of each waveguide tube slot antenna 31 is described also with reference to FIG. 9A to FIG. 9C.

The waveguide tube slot antenna 31 comprises, along a tube axis direction of a waveguide tube 40 comprising a waveguide 32 in an inside thereof, a plurality of radiating slots 33 and a plurality of inner walls 43 for reducing a cross sectional area of the waveguide 32 in formation positions of the radiating slots 33 at predetermined intervals. In the radiating slot 33 illustrated in FIG. 8A, a straight line extending through the central part in the width direction is inclined by 45° with respect to the tube axis direction (extending direction of the waveguide 32), but an inclination angle of the radiating slot 33 with respect to the tube axis direction can be set appropriately in accordance with a purpose or the like.

As illustrated in FIG. 9B and FIG. 9C, the waveguide tube 40 that forms the waveguide tube slot antenna 31 is a so-called rectangular waveguide tube comprising a pair of narrow walls 40a and 40b having a relatively short transverse sectional dimension which are parallel with each other and a pair of wide walls 40c and 40d having a relatively long transverse sectional dimension which are parallel with each other. The waveguide tube 40 according to this embodiment further comprises a pair of termination walls 40e and 40f for closing one opening and the other opening in the tube axis direction. The radiating slot 33 is formed so as to be opened in inner and outer surfaces of the one narrow wall 40a, and the inner wall 43 is erected on the inner surface of the other narrow wall 40b.

The narrow wall 40a comprises a plurality of recess parts 34 opened in the outer surface along the tube axis direction, and one radiating slot 33 is opened in an inner bottom surface of each recess part 34. The recess part 34 according to this embodiment is formed so as to have a perfect circle shape in plan view, but the recess part 34 may be formed so as to have a rectangle shape, an ellipse shape, or the like in plan view. By forming such recess parts 34, it is possible to suppress extraneous emission referred to also as grating lobes.

The narrow wall 40b comprises a power supply port (power supply slot) 35 opened in inner and outer surfaces thereof, and the high-frequency power (radio wave) is supplied into the waveguide 32 through the power supply waveguide tube 39 and the power supply port 35. In this embodiment, the power supply port 35 is formed in one end of the waveguide 32 in the tube axis direction (near location of the termination wall 40e). The inner wall 43 erected on the inner surface of the narrow wall 40b is formed so that two inner walls 43 and 43 adjacent to each other in the tube axis direction satisfy a relational expression of $h_1 \leq h_2$, where $h_1$ represents a height dimension of the inner wall 43 on a side relatively close to the power supply port 35 and $h_2$ represents a height dimension of the inner wall 43 on a side relatively far from the power supply port 35 (see the enlarged view in FIG. 9B).

The waveguide tube 40 that forms the waveguide tube slot antenna 31 is formed by coupling a first waveguide tube forming member 41 and a second waveguide tube forming member 42 to each other whose transverse sections, more specifically, transverse sections in each part of the waveguide 32 in the extending direction thereof, each have a shape with an end. In this embodiment, as illustrated in FIG. 9B and FIG. 9C, the waveguide tube 40 is formed by coupling the first waveguide tube forming member 41 integrally comprising one narrow wall 40a, portions forming a part of both the wide walls 40c and 40d, and portions forming a part of both the termination walls 40e and 40f to the second waveguide tube forming member 42 integrally comprising the other narrow wall 40b, portions forming the remaining part of both the wide walls 40c and 40d, and portions forming the remaining part of both the termination walls 40e and 40f. In short, in this embodiment, the waveguide tube 40 is formed by coupling the first waveguide tube forming member 41 and the second waveguide tube forming member 42 to each other whose transverse sections each have a U shape in each part of the waveguide 32 in the extending direction thereof.

The first waveguide tube forming member 41 is an injection-molded article of a resin, and the radiating slot 33 and the recess part 34 are formed by molding simultaneously with the injection molding. Further, the second waveguide tube forming member 42 is also an injection-molded article of a resin, and the inner wall 43 and the power supply port 35 are formed by molding simultaneously with the injection molding. As a molding resin for the waveguide tube forming members 41 and 42, a resin having, for example, at least one kind of thermoplastic resin selected from the group consisting of a liquid crystal polymer (LCP), a poly(phenylene sulfide) (PPS), and a polyacetal (POM) as a base resin thereof is used. An appropriate filler is added to the base resin as necessary. In this embodiment, the resin material having the LCP as the main ingredient to which an appropriate amount of glass fibers (GF) is added as a filler is used to perform the injection molding for the first waveguide tube forming member 41 and the second waveguide tube forming member 42. The LCP is preferred because the LCP is excellent in form stability compared to a PPS or the like and can preferably suppress an occurrence amount of burrs caused by the molding. Further, the glass fiber is preferred because the glass fiber is cheaper than a carbon fiber (CF) can provide high form stability and mechanical strength to a molded article.

As illustrated in the enlarged view in FIG. 9C, inside the second waveguide tube forming member 42, a conductive coating film 36 is formed on at least a defining surface of the waveguide 32. In the same manner, inside the first waveguide tube forming member 41, the conductive coating film 36 is formed on at least the defining surface of the waveguide 32 (not shown). With this configuration, the radio wave (high-frequency current) supplied into the waveguide tube 40 (waveguide tube slot antenna 31) formed by coupling the waveguide tube forming members 41 and 42 made of the resin can smoothly propagate along the waveguide 32. Note that, the conductive coating film 36 may be formed on entire surfaces of the waveguide tube forming members 41 and 42. With this configuration, masking formation work before the formation of the conductive coating film 36 and masking removal work after the formation of the conductive coating film 36 are unnecessary, which can suppress cost for coating film formation.

The conductive coating film 36 may be formed of a single-layer metal plated coating film, but in this embodiment, the conductive coating film 36 is formed of a first coating film 36a obtained by precipitation formation on the surfaces of the waveguide tube forming members 41 and 42 and a second coating film 36b obtained by precipitation formation on the first coating film 36a. The first coating film 36a can be a plated coating film of a metal that is particularly excellent in conductivity such as copper, silver, or gold. Further, the second coating film 36b can be a plated coating film of a metal that is excellent in resistance (corrosion resistance) such as nickel. With the conductive coating film 36 having such a stacked structure, a usage amount of an expensive metal such as copper and silver can be suppressed to obtain the conductive coating film 36 at low cost, and in addition, the conductive coating film 36 can have high conductivity and high resistance simultaneously.

As a method of forming the conductive coating film 36, for example, an electrolytic plating method or an electroless plating method can be employed, but the electroless plating method is preferred. This is because the electroless plating method is more likely to obtain the conductive coating film 36 (36a and 36b) having a uniform thickness than the electrolytic plating method, which is advantageous in ensuring desired antenna performance. The film thickness of the conductive coating film 36 becomes lower in resistance when being too thin, and when being too thick to the contrary, requires an excessive amount of time for coating film formation, which leads to increased cost. From such a viewpoint, the film thickness of the conductive coating film 36 is set to 0.2 μm or more and 1.5 μm or less. Note that, the film thickness of the first coating film 36a can be set to approximately from 0.1 to 1.0 μm, and the film thickness of the second coating film 36b can be set to approximately from 0.1 to 0.5 μm.

Note that, when there is no particular problem in terms of cost, the conductive coating film 36 can also be formed by stacking three or more kinds of metal plated coating films.

As described above, the waveguide tube slot antenna 31 according to this embodiment is completed by first forming the first waveguide tube forming member 41 and the second waveguide tube forming member 42 by the injection molding with the resin, forming the conductive coating film 36 on the defining surface of at least the waveguide 32 of both the waveguide tube forming members 41 and 42, and then coupling both the waveguide tube forming members 41 and 42 to each other. With this configuration, the one narrow wall 40a comprises the radiating slot 33 and the recess part 34, while the other narrow wall 40b comprises the inner wall 43 and the power supply port 35. Thus, the waveguide tube slot antenna 31 comprising a coupling part C of both the waveguide tube forming members 41 and 42 substantially in the central part in the height direction of both the wide walls 40c and 40d is obtained.

A coupling method for the first waveguide tube forming member 41 and the second waveguide tube forming member 42 is arbitrary, but in this embodiment, the depression and projection fitting (press-fitting) is used to integrally couple both the waveguide tube forming members 41 and 42 to each other. Specifically, of the first waveguide tube forming member 41 and the second waveguide tube forming member 42, a projection part 46 formed in one side (first waveguide tube forming member 41) is fitted (press-fitted) into a depression part 45 formed in the other side (second waveguide tube forming member 42), to thereby integrally couple both the waveguide tube forming members 41 and 42 to each other. Note that, as illustrated in, for example, FIG. 14, the coupling part C can also be formed by fitting the depression part 45 and the projection part 46 formed in the first waveguide tube forming member 41 into the projection part 46 and the depression part 45 formed in the second waveguide tube forming member 42. Further, as the coupling method for both the waveguide tube forming members 41 and 42, instead of the pressure-fitting, or in combination with the pressure-fitting, it is possible to employ, for example, adhesion or welding for fusing any one of or both the waveguide tube forming members 41 and 42 to couple both to each other.

As described above, the waveguide tube slot antenna 31 according to the second aspect comprises the inner wall 43 for reducing the cross sectional area of the waveguide 32 in the formation position of the radiating slot 33. With this configuration, it is possible to enhance radiant efficiency of the radio wave that propagates inside the waveguide 32. In particular, in the waveguide tube slot antenna 31 according to this embodiment, the power supply port 35 is formed in one end (in the vicinity of one end) of the waveguide 32 in the tube axis direction so that the two inner walls 43 and 43 adjacent to each other in the tube axis direction satisfy the relational expression of $h_1 \leq h_2$, where $h_1$ represents the height dimension of the inner wall 43 on the side relatively close to the power supply port 35 and $h_2$ represents the height dimension of the inner wall 43 on the side relatively far from the power supply port 35. With this configuration, the amount of radio waves radiated to the outside of the antenna 31 through each radiating slot 33 hardly varies among the radiating slots 33, which allows a substantially equal amount of the radio waves to be radiated from each radiating slot 33. Accordingly, it is possible to prevent variations of the antenna performance from occurring in each part of the waveguide tube slot antenna 31 in the tube axis direction as much as possible, which improves the reliability of the waveguide tube slot antenna 31.

The waveguide tube slot antenna 31 comprises a plurality of inner walls 43 described above in addition to the radiating slots 33 and the recess parts 34, which complicates the structure, and it is conceivable that the manufacturing cost increases. Such a concern can be resolved by using the waveguide tube 40 formed by coupling the waveguide tube forming members 41 and 42 made of the resin to each other as much as possible. That is, when the waveguide tube 40 is formed by coupling the first waveguide tube forming member 41 and the second waveguide tube forming member 42, as described above, the radiating slot 33 and the recess part 34 can be formed by molding simultaneously with the injection molding for the first waveguide tube forming member 41, and the inner wall 43 and the power supply port 35 can be formed by molding simultaneously with the injection molding for the second waveguide tube forming member 42. Accordingly, a component that affects the antenna performance of the waveguide tube slot antenna 31 can be obtained easily with high accuracy, and in addition, mass production cost therefor can be suppressed.

Further, the antenna performance of the waveguide tube slot antenna 31 can be appropriately changed by changing, for example, the formation mode of antenna components such as the radiating slots 33. Therefore, when the antenna components of the radiating slot 33 or the like are formed by molding simultaneously with the injection molding for the waveguide tube forming members 41 and 42, the waveguide tube slot antenna 31 corresponding to a requested characteristic can be subjected to mass production easily at low cost.

Both the waveguide tube forming members 41 and 42 that form the waveguide tube slot antenna 31 according to this embodiment are high in rigidity because each waveguide tube forming member has a transverse section formed so as to have a U shape in each part of the waveguide 32 in the extending direction thereof and integrally comprises portions that form the termination walls 40e and 40f. Therefore, the form stability of the waveguide 32 is high, which is advantageous in maintaining the antenna performance with high accuracy. Further, the first waveguide tube forming member 41 comprises the radiating slot 33 and the recess part 34, and the second waveguide tube forming member 42 comprises the power supply port 35 and the inner wall 43. Therefore, compared to a case where the radiating slot 33 and the power supply port 35 are formed across the coupling part C of both the waveguide tube forming members 41 and 42, it is possible to increase the form accuracy of the radiating slot 33, the power supply port 35, and the like, and to ensure high antenna performance.

As described above, the waveguide tube slot antenna 31 according to this embodiment can be preferably used as an antenna for transmitting and receiving a radio wave having a millimeter wave band (for example, 76-GHz band). This is because the waveguide tube 40 is divided in a plane that does not cross the radio wave (high-frequency current) flowing inside the waveguide 32 (coupling part C of both the waveguide tube forming members 41 and 42 is provided substantially in the central part in the height direction of both the wide walls 40c and 40d), which can prevent a current flowing inside the waveguide 32 from overflowing from the coupling part C onto the outside as much as possible. Accordingly, an antenna having a high gain (gain of substantially 21 dB or more) and a small transmission loss of the radio wave having a millimeter wave band can be realized.

Examples of a wireless device comprising the antenna for transmitting or receiving the radio wave having a millimeter wave band can include a millimeter wave radar mounted to an automobile for the purpose of safe driving support or the like. That is, the waveguide tube slot antenna 31 according to the second aspect (antenna unit A) can be applied as an antenna part of the on-vehicle millimeter wave radar. Although not shown, the on-vehicle millimeter wave radar is formed by, for example, stacking a signal processing substrate, a millimeter wave unit (millimeter wave transmitter/receiver), the antenna part, a radar dome, and the like on a support substrate.

Figure 10:
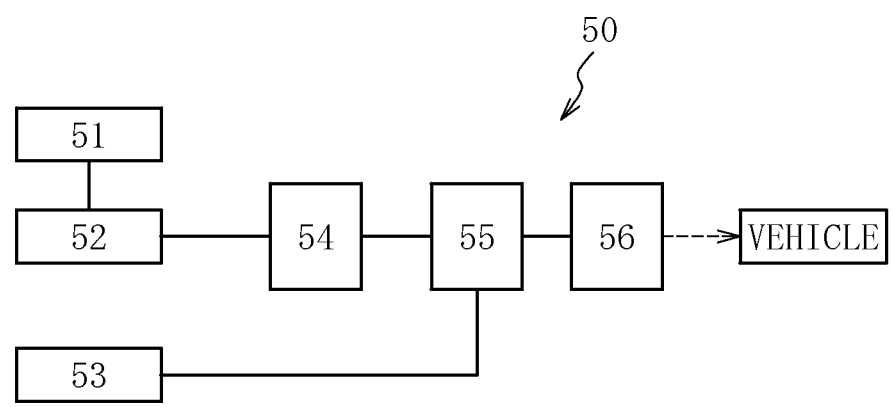
FIG. 10 is a block diagram illustrating an outline of a system configuration of a millimeter wave radar to which the antenna unit illustrated in FIG. 8 can be applied.

FIG. 10 illustrates an example of a system configuration of the millimeter wave radar for the sake of reference. A millimeter wave radar system 50 illustrated in FIG. 10 comprises an antenna part 51, a millimeter wave unit 52, a scanner part 53, an analog circuit part 54, a signal processing part 55, and the like, and the above-mentioned waveguide tube slot antenna 31 (antenna unit A) can be used as the antenna part 51. The scanner part 53 serves mainly to detect a position of a target object in a horizontal direction, and the antenna part 51 measures a distance from the target object and detects the position of the target object in the horizontal direction. The millimeter wave unit 52 comprises an oscillator, a mixer, an amplifier, and the like, and a beat signal output from the millimeter wave unit 52 is input to the signal processing part 55 through the analog circuit 54. In the signal processing part 55, the position of the target object is computed based on the beat signal output from the millimeter wave unit 52 and a signal output from the scanner part 53. The computation result is output to a control device on a vehicle side through an external interface 56.

The waveguide tube slot antenna 31 according to the first embodiment of the second aspect is described above, but appropriate changes can be made to the waveguide tube slot antenna 31 within a scope that does not depart from the gist of the present invention. Now, other embodiments of the second aspect are described with reference to the drawings, but the components equivalent to those of the embodiment described above are denoted by common reference symbols, and duplicate descriptions thereof are omitted as much as a possible.

Figure 11A:
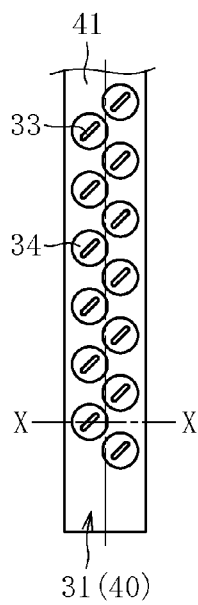
FIG. 11A is a schematic plan view of a waveguide tube slot antenna according to a second embodiment of the second aspect.

FIG. 11A to FIG. 11D illustrate the waveguide tube slot antenna 31 according to a second embodiment of the second aspect. In the waveguide tube slot antenna 31 according to this embodiment, as illustrated in FIG. 11A, two radiating slot rows each obtained by arranging the plurality of radiating slots 33 along the tube axis direction at predetermined intervals are provided in the width direction of the waveguide tube 40, and at the same time, the radiating slot 33 forming one of the radiating slot rows and the radiating slot 33 forming the other radiating slot row are located in mutually different positions in the tube axis direction. To briefly describe, in the waveguide tube slot antenna 31 according to this embodiment, the plurality of radiating slots 33 (and recess parts 34) are arranged in a staggered shape.

Figure 11B:
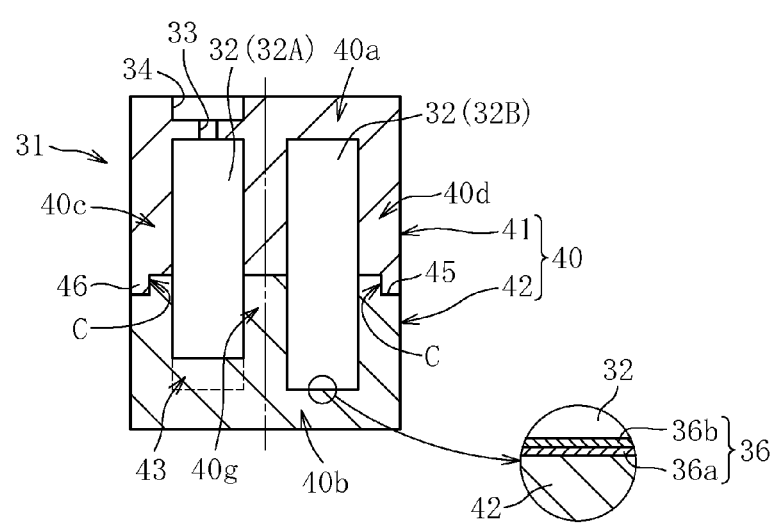
FIG. 11B is a schematic sectional view taken along the line X-X illustrated in FIG. 11A.
Figure 11C:
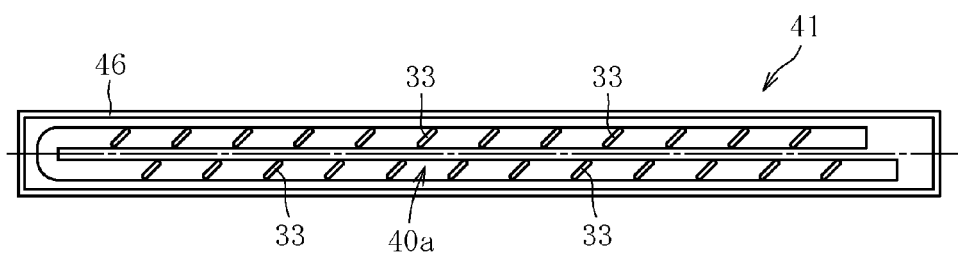
FIG. 11C is a developed plan view of a first waveguide tube forming member that forms the waveguide tube slot antenna illustrated in FIG. 11A.
Figure 11D:
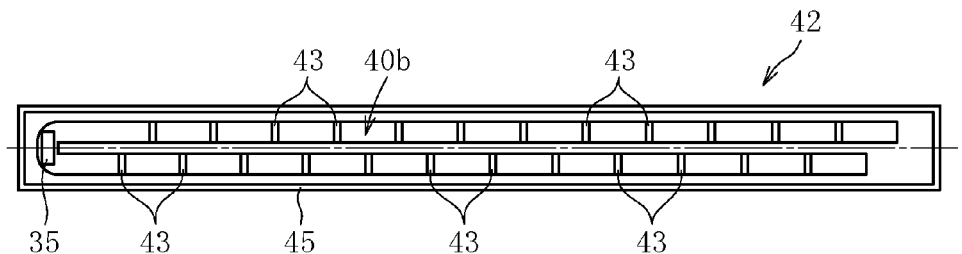
FIG. 11D is a developed plan view of a second waveguide tube forming member that forms the waveguide tube slot antenna illustrated in FIG. 11A.

As illustrated in FIG. 11B, the waveguide tube 40 that forms the waveguide tube slot antenna 31 according to this embodiment is a rectangular waveguide tube comprising the pair of narrow walls 40a and 40b and the pair of wide walls 40c and 40d, and further comprises a branching wall 40g placed in parallel with the wide walls 40c and 40d, for branching the waveguide 32 into waveguides 32A and 32B. Then, the one narrow wall 40a comprises the radiating slot 33 and the recess part 34 (not shown), and the other narrow wall 40b comprises the inner wall 43 and the power supply port 35. Note that, one of the radiating slot rows is formed along the waveguide 32A, and the other radiating slot row is formed along the waveguide 32B.

The waveguide tube 40 that forms the waveguide tube slot antenna 31 according to this embodiment is also formed by coupling the first waveguide tube forming member 41 and the second waveguide tube forming member 42 made of the resin to each other whose transverse sections each have a shape with an end in each part of the waveguide 32 in the extending direction thereof and in which the conductive coating film 36 is formed on at least the defining surface of the waveguide 32. Specifically, the waveguide tube 40 is formed by coupling the first waveguide tube forming member 41 (see FIG. 11C) integrally comprising the one narrow wall 40a comprising the radiating slot 33 and the recess part 34, portions forming a part of both the wide walls 40c and 40d, portions forming a part of both the termination walls 40e and 40f, and a portion forming a part of the branching wall 40g to the second waveguide tube forming member 42 (see FIG. 10D) integrally comprising the other narrow wall 40b comprising the inner wall 43 and the power supply port 35, portions forming the remaining part of both the wide walls 40c and 40d, portions forming the remaining part of both the termination walls 40e and 40f, and a portion forming the remaining part of the branching wall 40g. The coupling part C of both the waveguide tube forming members 41 and 42 is provided substantially in the central part in the height direction of both the wide walls 40c and 40d, and the coupling part C is formed by fitting (press-fitting) the projection part 46 formed in the first waveguide tube forming member 41 into the depression part 45 formed in the second waveguide tube forming member 42.

Although not shown, three or more radiating slot rows can be provided. In this case, it suffices that two or more branching walls 40g be erected. The same applies to the following embodiments.

Figure 12:
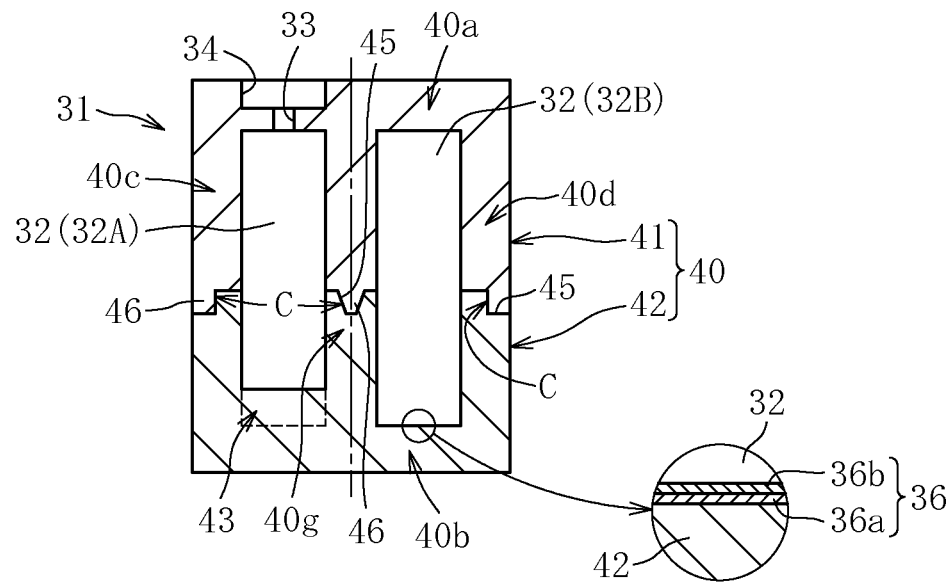
FIG. 12 is a transverse sectional view of a waveguide tube slot antenna according to a third embodiment of the second aspect.

FIG. 12 is a transverse sectional view of the waveguide tube slot antenna 31 according to a third embodiment of the second aspect, and is a modification example of the embodiment illustrated in FIG. 11. The waveguide tube slot antenna 31 according to this embodiment is different from the waveguide tube slot antenna 31 according to the embodiment illustrated in FIG. 11 mainly in that the branching wall 40g is also comprising the coupling part C formed by fitting (press-fitting) the projection part 46 into the depression part 45.

Figure 13:
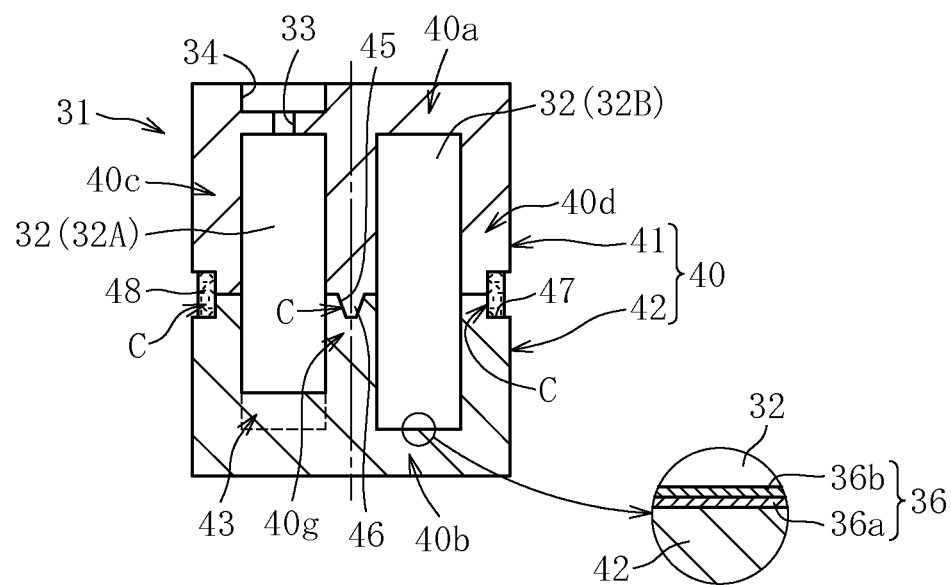
FIG. 13 is a transverse sectional view of a waveguide tube slot antenna according to a fourth embodiment of the second aspect.

FIG. 13 is a transverse sectional view of the waveguide tube slot antenna 31 according to a fourth embodiment of the second aspect, and is a modification example of the embodiment illustrated in FIG. 11. The antenna 31 illustrated in FIG. 13 is different from the antenna 31 illustrated in FIG. 11 mainly in that both the waveguide tube forming members 41 and 42 are coupled to each other by using both the adhesion and the depression and projection fitting (press-fitting). Specifically, both the waveguide tube forming members 41 and 42 are integrally coupled to each other by an adhesive 48 solidified inside an adhesive reservoir 47 formed in the outer surface of the wide walls 40c and 40d and the termination walls 40e and 40f and the depression and projection fitting structure formed in the branching wall 40g.

As the adhesive 48, the anaerobic adhesive, the ultraviolet curable adhesive, the thermosetting adhesive, and the like can be used, but with the thermosetting adhesive that requires the heat processing when the adhesive 48 is solidified, the waveguide tube forming members 41 and 42 made of the resin may be deformed or the like while being subjected to the heat processing. Therefore, the anaerobic adhesive or the ultraviolet curable adhesive is preferred as the adhesive 48 to be used to couple both the members 41 and 42 to each other. Note that, the adhesive is generally an isolator, and hence when the adhesive adheres to the defining surface of the waveguide 32, there is a fear that the propagation property of the radio wave may be adversely affected. Therefore, when the first waveguide tube forming member 41 and the second waveguide tube forming member 42 are integrally coupled to each other by the adhesion, it is important to pay attention so as to prevent the adhesive 48 from adhering to the defining surface of the waveguide 32.

Figure 14:
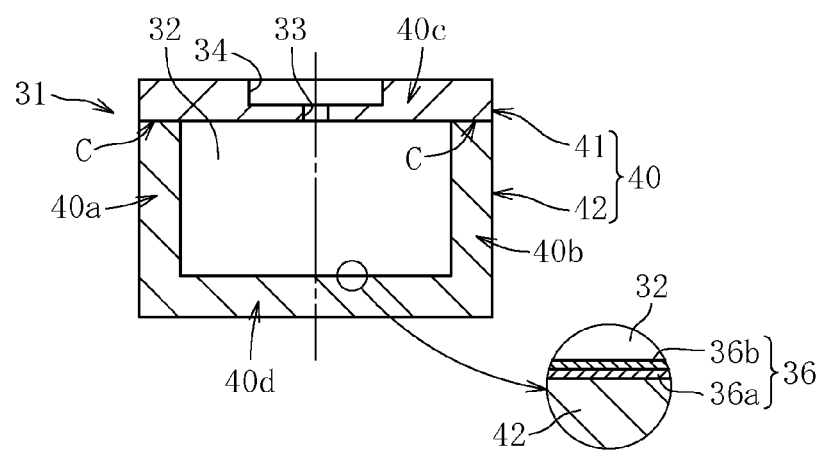
FIG. 14 is a transverse sectional view of a waveguide tube slot antenna according to a fifth embodiment of the second aspect.
Figure 15:
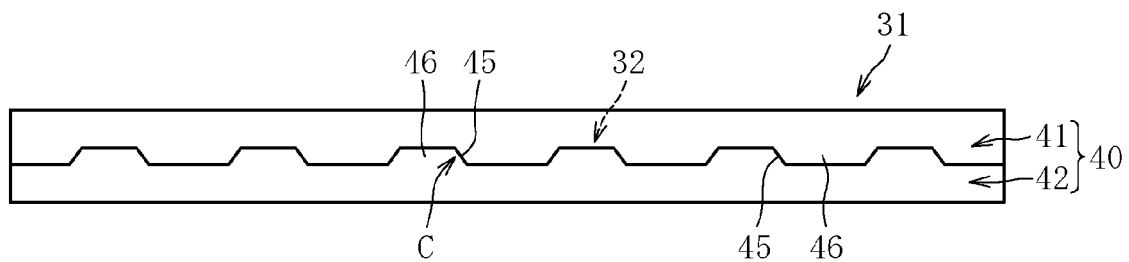
FIG. 15 is a schematic side view of a waveguide tube slot antenna according to a modification example.

FIG. 14 is a schematic transverse sectional view of the waveguide tube slot antenna 31 according to a fifth embodiment of the second aspect. The waveguide tube slot antenna 31 according to this embodiment is different from the waveguide tube slot antenna 31 according to the above-mentioned embodiments mainly in that the radiating slot 33 and the recess part 34 are formed in one wide wall 40c and that the inner wall 43 and the power supply port 35 are formed in the other wide wall 40d (the inner wall 43 and the power supply port 35 are not shown in FIG. 13), and further in that the first waveguide tube forming member 41 is formed of a flat member comprising the one wide wall 40c.

The first waveguide tube forming member 41 is a flat member of the waveguide tube slot antenna 31 comprising the one wide wall 40c and the radiating slot 33 and the recess part 34. The first waveguide tube forming member 41 is coupled to the second waveguide tube forming member 42 comprising the other wide wall 40d in which the transverse section in each part of the waveguide 32 in the extending direction thereof is formed so as to have a U shape, to thereby complete the waveguide tube slot antenna 31. In the waveguide tube slot antenna 31 according to this embodiment, the coupling part C of both the waveguide tube forming members 41 and 42 is formed by, for example, subjecting both the members 41 and 42 to the adhesion, but can also be formed by the depression and projection fitting (press-fitting) or the welding.

According to such a configuration, of the two waveguide tube forming members 41 and 42 that form the waveguide tube 40, the shape of the first waveguide tube forming member 41 is simplified, and hence the waveguide tube slot antenna 31 can be formed at further lower cost. Although not shown, also in a case of employing the configuration according to this embodiment, the branching wall 40g for branching the waveguide 32 can be provided.

When the radio wave (high-frequency current) is caused to flow through the waveguide 32 of the waveguide tube slot antenna 31 according to this embodiment, a portion in which the high-frequency current flowing through the waveguide 32 is intense is the same as formation portion of the coupling part C of both the waveguide tube forming members 41 and 42. Therefore, when adhesiveness of both the waveguide tube forming members 41 and 42 in the coupling part C is insufficient, there is a fear that the current flowing through the waveguide 32 may overflow to the outside. Therefore, the waveguide tube slot antenna 31 according to this embodiment can be preferably used as an antenna for transmitting or receiving a radio wave having a low-frequency bandwidth (for example, radio wave having a centimeter wave band) rather than as the antenna for transmitting or receiving the radio wave having a millimeter wave band.

As described above, both the waveguide tube forming members 41 and 42 are integrally coupled to each other by means such as the depression and projection fitting (press-fitting), the adhesion, or the welding, but both the waveguide tube forming members 41 and 42 can be integrally coupled to each other by using a fastening member such as a screw and a bolt, to thereby form the waveguide tube 40 that forms the waveguide tube slot antenna 31.

Further, the waveguide tube 40 can also be formed by coupling the waveguide tube forming members 41 and 42 to each other whose transverse sections each have an L-shape in each part of the waveguide 32 in the extending direction thereof, or by coupling the waveguide tube forming members 41 and 42 to each other whose transverse sections each have an arc shape in each part of the waveguide 32 in the extending direction thereof (both not shown).

In addition, in the above-mentioned embodiments, the first waveguide tube forming member 41 and the second waveguide tube forming member 42 are the injection-molded article of the resin, but any one of or both the waveguide tube forming members 41 and 42 can be a metal machined article, a plastic worked article, or an injection-molded article of a low-melting metal (for example, magnesium or aluminum). In this case, the conductive coating film 36 becomes unnecessary, and thus the increase in cost caused by replacing the entire waveguide tube forming members 41 and 42 from a resin to a metal can be substantially canceled out.

The waveguide tube slot antenna according to the present invention can preferably be applied as the antenna part of the wireless device using the radio wave having a millimeter wave band or as the antenna part of the wireless device using the radio wave having a centimeter wave band depending on an arrangement mode of the radiating slot or the like.

Specific examples of the wireless device (wireless system) that can preferably employ the waveguide tube slot antenna according to the present invention include, not only the above-mentioned on-vehicle radar for the purpose of collision prevention, but also a security system for an automobile, a home security system, a supervisory system for a runway, a wireless transmission system installed in a house or the like (for example, home server or transmission system for high-definition picture), a whole body scanner used in an airport or the like, various information terminals, an electronic toll collection system (ETC: trademark), a safety confirmation system for confirming whether or not a target person is safe by detecting his/her biological reaction, and an alarm system for detecting that a person or a vehicle has entered a crossing and informing thereof.

REFERENCE SIGNS LIST 1 waveguide tube slot antenna
2 waveguide
3 radiating slot
4 recess part
5 power supply port
6 conductive coating film
6a first coating film
6b second coating film
10 waveguide tube
11 first waveguide tube forming member
12 second waveguide tube forming member
31 waveguide tube slot antenna
32 waveguide
33 radiating slot
34 recess part
35 power supply port
36 conductive coating film
36a first coating film
36b second coating film
40 waveguide tube
40a narrow wall
40b narrow wall
40c wide wall
40d wide wall
40g branching wall
41 first waveguide tube forming member
42 second waveguide tube forming member
43 inner wall
C coupling part

The invention claimed is:

1. A waveguide tube slot antenna, comprising:
a plurality of waveguides arranged in parallel with each other and each extending in a tube axis direction;
a plurality of radiating slots formed along each of the plurality of waveguides at predetermined intervals in the tube axis direction; and
a plurality of waveguide tubes connected in parallel with each other,
wherein the plurality of waveguide tubes each comprise a first waveguide tube forming member and a second waveguide tube forming member each having a transverse section having a shape with an end, the first waveguide tube forming member and the second waveguide tube forming member being configured to define one of the plurality of waveguides by being coupled to each other,
wherein any one of the first waveguide tube forming member and the second waveguide tube forming member comprises the radiating slots and another one of the first waveguide tube forming member and the second waveguide tube forming member comprises a plurality of inner walls arranged at predetermined intervals in the tube axis direction, each of the plurality of inner walls reducing a cross sectional area in a direction perpendicular to the tube axis direction of the waveguide, and
wherein each of the plurality of inner walls is positioned immediately below a corresponding one of the plurality of radiating slots.

2. The waveguide tube slot antenna according to claim 1, wherein the first waveguide tube forming member and the second waveguide tube forming member each have a shape with a corner part in the transverse section.

3. The waveguide tube slot antenna according to claim 1, wherein the another of the first waveguide tube forming member and the second waveguide tube forming member comprises a power supply port.

4. The waveguide tube slot antenna according to claim 1, wherein the plurality of waveguide tubes are separably connected in parallel with each other.

5. The waveguide tube slot antenna according to claim 1, further comprising a plurality of recess parts arranged along the waveguide at predetermined intervals in the tube axis direction, each of the radiating slots opening in an inner bottom of a corresponding one of the recess parts.

6. The waveguide tube slot antenna according to claim 1, wherein the first waveguide tube forming member and the second waveguide tube forming member are both formed of a resin and each comprise at least a conductive coating film formed on a defining surface of the waveguide.

7. The waveguide tube slot antenna according to claim 6, wherein the resin comprises a liquid crystal polymer as a main ingredient thereof.

8. The waveguide tube slot antenna according to claim 6, wherein the conductive coating film is set to have a film thickness of 0.2 μm to 1.5 μm.

9. The waveguide tube slot antenna according to claim 6, wherein the conductive coating film is formed by stacking two or more kinds of metal plated coating films.

10. A wireless device, comprising the waveguide tube slot antenna of claim 1.

11. A waveguide tube slot antenna, comprising:
a waveguide tube comprising a waveguide extending in a tube axis direction;
a plurality of radiating slots arranged along the waveguide at predetermined intervals in the tube axis direction; and
a plurality of inner walls arranged along the waveguide at predetermined intervals in the tube axis direction, each of the inner walls provided at a position immediately below a corresponding one of the plurality of radiating slots and reducing a cross sectional area in a direction perpendicular to the tube axis direction of the waveguide,
wherein the waveguide tube comprises a first waveguide tube forming member and a second waveguide tube forming member each having a transverse section having a shape with an end, the first waveguide tube forming member and the second waveguide tube forming member being configured to define the waveguide by being coupled to each other, and
wherein one of the first waveguide tube forming member and the second waveguide tube forming member comprises the radiating slots and another of the first waveguide tube forming member and the second waveguide tube forming member comprises the plurality of inner walls.

12. The waveguide tube slot antenna according to claim 11, further comprising a power supply port,
   wherein two of the plurality of inner walls adjacent to each other in the tube axis direction satisfy a relational expression of $h_1 \leq h_2$, where $h_1$ represents a height dimension of one of the two inner walls on a side relatively close to the power supply port and $h_2$ represents a height dimension of another of the two inner walls on a side relatively far from the power supply port.

13. The waveguide tube slot antenna according to claim 11, further comprising a plurality of recess parts arranged along the waveguide at predetermined intervals in the tube axis direction, each of the radiating slots opening in an inner bottom of a corresponding one of the recess parts.

14. The waveguide tube slot antenna according to claim 11, wherein the first waveguide tube forming member and the second waveguide tube forming member are both formed of a resin and each comprise at least a conductive coating film formed on a defining surface of the waveguide.

15. The waveguide tube slot antenna according to claim 14, wherein the resin comprises a liquid crystal polymer as a main ingredient thereof.

16. The waveguide tube slot antenna according to claim 14, wherein the conductive coating film is set to have a film thickness of 0.2 μm to 1.5 μm.

17. The waveguide tube slot antenna according to claim 14, wherein the conductive coating film is formed by stacking two or more kinds of metal plated coating films.

18. The waveguide tube slot antenna according to claim 11, wherein:
   the waveguide tube comprises a rectangular waveguide tube comprising:
      a pair of wide walls having a relatively long transverse sectional dimension which are parallel with each other; and
      a pair of narrow walls having a relatively short transverse sectional dimension which are parallel with each other;
   any one of the pair of narrow walls comprises the plurality of radiating slots, and another of the pair of narrow walls comprises the plurality of inner walls; and
   each of the first waveguide tube forming member and the second waveguide tube forming member comprises a respective one the pair of narrow walls.

19. The waveguide tube slot antenna according to claim 11, wherein:
   the waveguide tube comprises a rectangular waveguide tube comprising:
      a pair of wide walls having a relatively long transverse sectional dimension which are parallel with each other; and
      a pair of narrow walls having a relatively short transverse sectional dimension which are parallel with each other;
   any one of the pair of wide walls comprises the plurality of radiating slots, and another of the pair of wide walls comprises the plurality of inner walls; and
   each of the first waveguide tube forming member and the second waveguide tube forming member comprises a respective one of the pair of wide walls.

20. A wireless device, comprising the waveguide tube slot antenna of claim 11.

* * * * *